No. 699,986. Patented May 13, 1902.
W. SULLIVAN.
CAR FENDER.
(Application filed July 15, 1901.)
(No Model.)

Witnesses:
F. W. Dueuckel.
Alfred A. Eicks

Inventor:
William Sullivan.
by Higdon & Longan,
Attorneys

THE NORRIS PETERS CO., PHOTO-LITHO., WASHINGTON, D. C.

UNITED STATES PATENT OFFICE.

WILLIAM SULLIVAN, OF ST. LOUIS, MISSOURI.

CAR-FENDER.

SPECIFICATION forming part of Letters Patent No. 699,986, dated May 13, 1902.

Application filed July 15, 1901. Serial No. 68,277. (No model.)

*To all whom it may concern:*

Be it known that I, WILLIAM SULLIVAN, of the city of St. Louis, State of Missouri, have invented certain new and useful Improvements in Car-Fenders, of which the following is a full, clear, and exact description, reference being had to the accompanying drawings, forming a part hereof.

This invention relates to car-fenders; and it consists of the novel construction, combination, and arrangement of parts hereinafter shown, described, and claimed.

The object of this invention is to provide a car-fender which is normally supported in an elevated position above the track and which is provided with a separate portion which extends in front of the main body of the fender and is designed to come in contact with any object which may be on the track to automatically release the fender and permit the same to be lowered onto the track.

Figure 1:
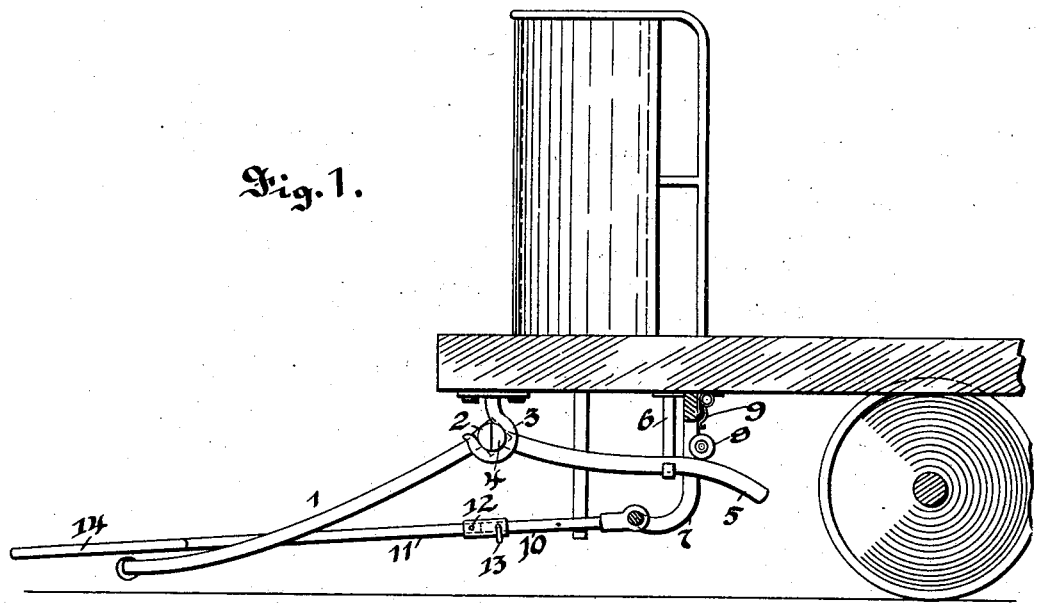
Figure 2:
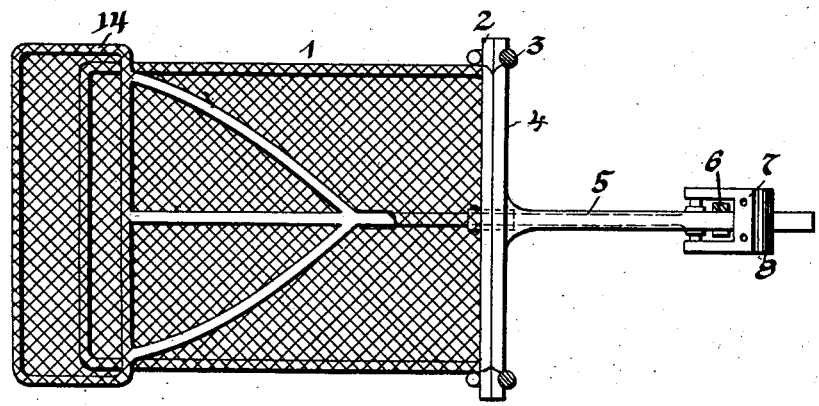
Figure 3:
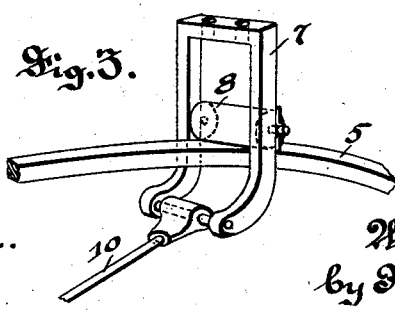

Figure 1 is a side view of the fender attached to a car. Fig. 2 is a plan view of the fender removed. Fig. 3 is a perspective view of the attachment which upholds the fender.

1 indicates the fender, to the rear end of which is connected a triangular rod or bar 2, the ends of which are semicircular in cross-section and which have bearing in the hooks or bearings 3, secured to the under side of the car. The rear side of the member 2 is flat and bears against the flat side of a corresponding member 4, which is identical in shape with the said member 2 and the ends of which have bearing in the hooks or bearings 3. An arm 5 is rigid with the rear side of the rod or bar 4 and rests within the hook or support 6, thereby upholding the said arm when the rod or bar 2 is removed from the bearings 3.

7 indicates a frame which is hinged to the under side of the car adjacent to the support 6 and which carries a roller or cross member 8, which holds the arm 5 in position and prevents the same from being raised by the weight of the fender. A spring 9 holds the frame 7 in its vertical position, but permits the said frame to be pressed to the rear, thereby raising the roller 8 and permitting the arm 5 to be raised and the fender 1 to drop to the track. The said frame 7 is operated automatically, as will now be described.

10 indicates a rod which is connected to the lower portion of the said frame 7 and which extends forwardly and is connected to a rod 11 by means of the sleeve 12, rigid with the said rod 11, and adapted to inclose the forward end of the rod 10, in which position it is secured by means of the set-screw 13. By inserting the end of the rod 10 within the sleeve 12 and tightening the screw 13 these rods will be firmly held together, but may be released whenever desired by loosening the said set-screw 13. The rod 11 extends forwardly through an opening formed in the fender 1, and the forward end of the said rod is bifurcated, as clearly shown in Fig. 2, and the end of the forks are connected to a frame 14, which extends a suitable distance in front of the fender 1, so that it will first strike against any object which may be on the track. The frame 14 is entirely independent of the main body of the fender and may be separated therefrom when desired, and from this it results that when the said frame strikes against any object it will be pressed to the rear, together with the rods 10 and 11, thereby operating the frame 7 in opposition to the spring 9. This will raise the roller 8 and permit the arm 5 to be raised by the weight of the fender 1. The ends of the rods or bars 2 4 fit snugly within the bearings 3, so that the flat side of the said rods or bars will be held closely against each other, thereby upholding the fender when the arm 5 is in the position shown in Fig. 1; but whenever the arm 5 is released the weight of the fender will raise the said arm, permitting the fender to be lowered onto the track to pick up any object which may be in the way.

The fender may be detached and transferred from one end of the car to the other by releasing the sleeve 12 from the rod 10 and raising the rod or bar 2 out of the bearings 3, which are specially constructed to permit such operation. The other parts will be retained in position, so that the fender may be applied in position by simply attaching the sleeve 12 over the end of the rod 10 and placing the ends of the rod or bar 2 in the bearings 3, so that the flat surface of the said rod or bar bears against the flat surface of the member 4.

The opposite end of the car may also be provided with the attachment whereby the fender is held in place and with the automatic tripping device whereby the fender will be released and permitted to drop to the track.

I claim—

In a car-fender, a fender pivotally mounted; an arm 5 extending backwardly from the center of the fender; the frame 7 hinged to the lower face of the car-bed the roller 8 mounted in said frame, and engaging the arm 5 as required to hold the front end of the frame lifted; a spring 9 holding said frame in its vertical position, said frame being mounted to swing backwardly against the tension of the spring as required to carry the roller 8 out of engagement with the arm 5 and allow the arm 5 to swing upwardly, thus depressing the forward end of the fender; the rod 10 connected to the lower end of the frame 7 and extending forwardly; the sleeve 12 upon the forward end of the rod 10; the rod 11 connected to the forward end of the sleeve 12 and extending forwardly through an opening in the fender, the forward end of said rod being bifurcated; the secondary fender or frame 14 mounted upon the forward end of said rod and projecting beyond the first fender, so that when the secondary fender strikes an obstruction on the track, the frame 7 will be operated to allow the arm 5 to be lifted, thus depressing the forward end of the fender, substantially as specified.

In testimony whereof I affix my signature in presence of two witnesses.

WILLIAM SULLIVAN.

Witnesses:
ALFRED A. EICKS,
JOHN D. RIPPEY.